United States Patent
Kurnaz

(10) Patent No.: US 10,614,556 B2
(45) Date of Patent: Apr. 7, 2020

(54) IMAGE PROCESSOR AND METHOD FOR IMAGE PROCESSING

(71) Applicant: Jaguar Land Rover Limited, Whitley, Coventry, Warwickshire (GB)

(72) Inventor: Ersin Kurnaz, Coventry (GB)

(73) Assignee: Jaguar Land Rover Limited, Coventry, Warwickshire (GB)

(*) Notice: Subject to any disclaimer, the term of this patent is extended or adjusted under 35 U.S.C. 154(b) by 102 days.

(21) Appl. No.: 16/023,708

(22) Filed: Jun. 29, 2018

(65) Prior Publication Data

US 2019/0043174 A1 Feb. 7, 2019

(30) Foreign Application Priority Data

Aug. 1, 2017 (GB) .................................... 1712333.2

(51) Int. Cl.
*G06T 5/00* (2006.01)
*G06T 5/20* (2006.01)

(52) U.S. Cl.
CPC ............... *G06T 5/003* (2013.01); *G06T 5/00* (2013.01); *G06T 5/20* (2013.01); *G06T 2207/30252* (2013.01)

(58) Field of Classification Search
CPC .. G06T 5/003; G06T 5/00; G06T 5/20; G06T 2207/30252; G06T 1/20
USPC ...................................................... 382/255
See application file for complete search history.

(56) References Cited

U.S. PATENT DOCUMENTS

| 2012/0207401 A1* | 8/2012 | Archer ............... G02B 27/0025 382/254 |
| 2013/0342691 A1 | 12/2013 | Lewis et al. |
| 2017/0169550 A1* | 6/2017 | Dewhurst .......... G06K 9/00711 |
| 2017/0341513 A1* | 11/2017 | Wu ........................ B60K 35/00 |

FOREIGN PATENT DOCUMENTS

WO 2014012070 A1 1/2014

OTHER PUBLICATIONS

Patents Act 1977: Combined Search and Examination Report under Sections 17 and 18(3), UKIPO Application No. GB1712333.2, Jan. 12, 2018, 6 pp.

\* cited by examiner

*Primary Examiner* — Ayodeji O Ayotunde
(74) *Attorney, Agent, or Firm* — Myers Bigel, P.A.

(57) ABSTRACT

An image processor for a vehicle includes an input, a first image processor, a second image processor, an output, and a third image processor. The input receives image data from a first imaging device. The first image processor receives the image data from the input and processes the image data to generate first processed image data. The second image processor receives the first processed image data and generates an image for display by a display. The second image processor renders at least a portion of the first processed image data to generate second processed image data. The output is configured to output the second processed image data to the display. The third image processor receives the first processed image data and analyses the first processed image data.

20 Claims, 6 Drawing Sheets

| 0 | +1/8 | 0 |
|---|---|---|
| +1/8 | +1/2 | +1/8 |
| 0 | +1/8 | 0 |

501

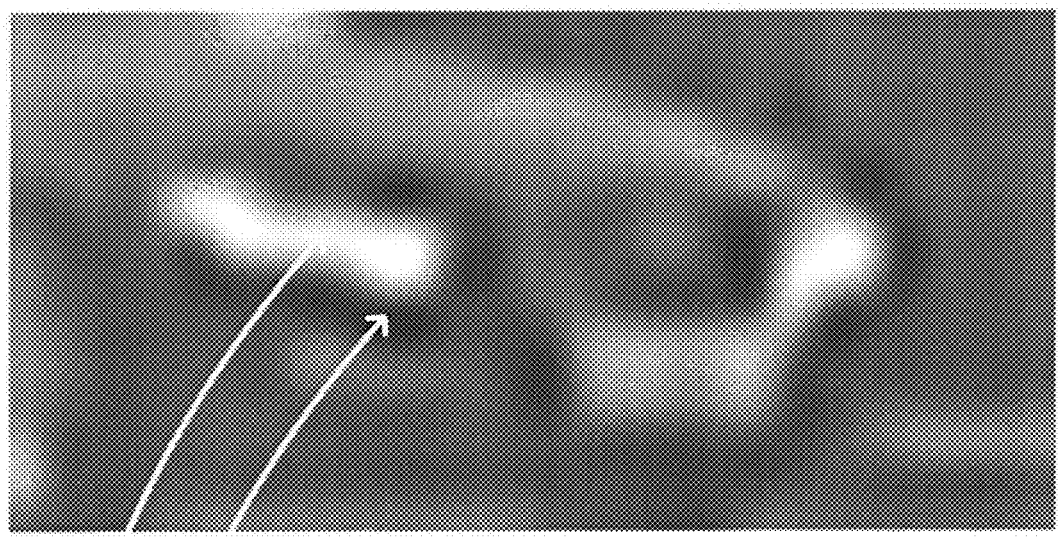
Figure 8
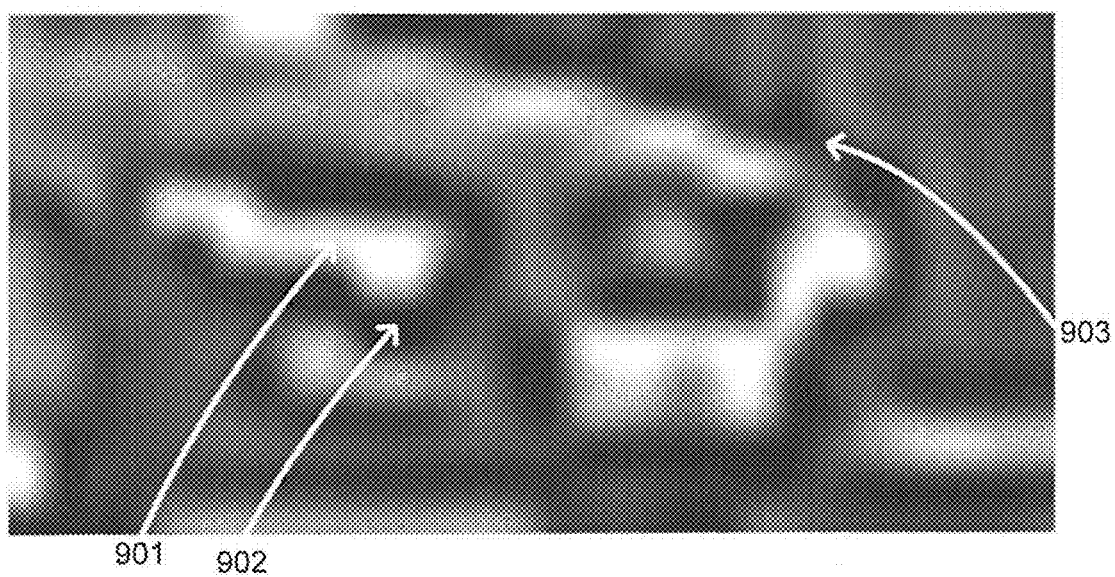
Figure 9A
Figure 9B

IMAGE PROCESSOR AND METHOD FOR IMAGE PROCESSING

CROSS-REFERENCE TO RELATED APPLICATION

This application claims priority under 35 U.S.C. § 119 to Great Britain Application No. 1712333.2, filed Aug. 1, 2017, the content of which is incorporated herein by reference in its entirety.

TECHNICAL FIELD

The present disclosure relates to an image processor and a method for image processing and particularly, but not exclusively, to an image processor suitable for use in a vehicle and a method for processing images captured from a vehicle. Aspects of the invention relate to an image processor, to an imaging system, to a vehicle, to an image processing method and to computer software arranged to perform an image processing method.

BACKGROUND

A vehicle may include one or more imaging devices for capturing images from the vehicle. Captured images, might include images of the vehicle's surroundings, such as the vehicle's surroundings to the rear, the sides and/or to the front of the vehicle. Images may be captured from a vehicle for a variety of different reasons. In general, images captured from a vehicle may be used to display all or part of an image to a human (such as a driver of the vehicle) and/or may be used for automated image analysis (e.g. performed by an electronic processor). The use of a captured image for display to a human may be referred to as human vision. The use of a captured imaged for performing automated image analysis may be referred to as computer vision.

Human vision applications of an image captured from a vehicle may include displaying a captured image to an occupant of the vehicle, such as a driver of the vehicle. Displaying an image to a driver of the vehicle may improve the driver's awareness of the surroundings of the vehicle. For example, a displayed image may include aspects of the surroundings of the vehicle which are not otherwise clearly visible to the driver. In one such example, an image of the surroundings to the rear of the vehicle may be displayed to a driver whilst the vehicle is reversing. This may improve the driver's ability to successfully manoeuvre the vehicle whilst reversing.

Computer vision applications of an image captured from a vehicle may include analysing an image (e.g. by an electronic processor) in order to determine relevant information from the image. For example, an image may be analysed so as to detect the presence of objects in the vicinity of the vehicle such as another vehicle, a pedestrian, a curb, a wall, markings on a road, a road sign etc. Detection of such objects may be used to alert a driver of the vehicle to the presence of such objects or to information related to the objects. For example, the driver may be alerted to the presence of an object with which the vehicle may collide with and/or may be presented with relevant information determined from analysis of an image, such as a speed limit displayed by a road sign or a distance to an object. Additionally or alternatively detection of such objects may be input to an autonomous driving system which may control one or more aspects of movement of the Vehicle. For example, the speed with which the vehicle travels may be controlled in dependence on one or more objects detected in a captured image, such as the presence and speed of other vehicles on the road, a speed limit determined from a road sign in the image and/or the presence of an obstruction such as a pedestrian in the road. Additionally or alternatively, the direction in which the vehicle travels may be controlled in dependence on one or more objects detected in a captured image, such as lane markings on a road, a curb and/or the presence of obstructions such as other vehicles, a wall, a post etc.

One or more desirable properties of an image may be different for human vision applications and computer vision applications. For example, an image to be used for human vision applications may be enhanced for display to a human. Such enhancement may include performing one or more image processing techniques designed to improve human perception of aspects of the image when displayed to a human. However, such enhancement which may be performed for human vision applications may not be desirable for the purposes of computer vision applications. For example, image enhancement for human vision applications may in some instances lead to undesirable detection errors occurring when an image enhanced for human vision applications is used for computer vision applications.

In order to circumvent a difference in requirements for computer vision and human vision requirements, separate images may be captured, for example using separate imaging devices, for computer vision and human vision applications. However, such an approach increases an amount of hardware required as well an amount of power consumed in order to provide both human vision and computer vision image functionality.

It is an object of embodiments of the invention to at least mitigate or obviate one or more problems associated with the prior art, whether identified herein or otherwise.

SUMMARY OF THE INVENTION

Aspects and embodiments of the invention provide an image processor, an imaging system, a vehicle, an image processing method and computer software as claimed in the appended claims.

According to an aspect of the invention there is provided an image processor for a vehicle, the image processor comprising: input means for receiving image data from a first imaging device; first image processing means for receiving the image data from the input means and processing the image data to generate first processed image data; second image processing means arranged to receive the first processed image data to generate an image for display by a display means, wherein the second image processing means is arranged to generate second processed image data in dependence on at least a portion of the first processed image data; output means for outputting the second processed image data to the display means; and third image processing means arranged to receive the first processed image data and to analyse the first processed image data.

According to a further aspect of the invention there is provided an image processor for a vehicle, the image processor comprising: input means for receiving image data from a first imaging device; first image processing means for receiving the image data from the input means and processing the image data to generate first processed image data; second image processing means arranged to receive the first processed image data to generate an image for display by a display means, wherein the second image processing means comprises rendering means for rendering at least a portion of the first processed image data to generate second processed image data; output means for outputting the second processed image data to the display means; and third image processing means arranged to receive the first processed image data and to analyse the first processed image data.

According to an aspect of the invention there is provided an image processor for a vehicle, the image processor comprising: input means arranged to receive image data from a first imaging device positioned on or within the vehicle, the image data being indicative of an image scene exterior to the vehicle; first image processing means for receiving the image data from the input means and processing the image data to generate first processed image data; second image processing means arranged to receive the first processed image data to generate an image for display by a display means, wherein the second image processing means is arranged to generate second processed image data in dependence on at least a portion of the first processed image data; output means for outputting the second processed image data to the display means; and third image processing means arranged to receive the first processed image data and to analyse the first processed image data.

According to a further aspect of the invention there is provided an image processor for a vehicle, the image processor comprising: input means arranged to receive image data from a first imaging device positioned on or within the vehicle, the image data being indicative of an image scene exterior to the vehicle; first image processing means for receiving the image data from the input means and processing the image data to generate first processed image data; second image processing means arranged to receive the first processed image data to generate an image for display by a display means, wherein the second image processing means comprises rendering means for rendering at least a portion of the first processed image data to generate second processed image data; output means for outputting the second processed image data to the display means; and third image processing means arranged to receive the first processed image data and to analyse the first processed image data.

By providing the first processed image data to both the second image processing means and the third image processing means, an image processing stream is split into two different streams carried out by the second and third image processing means respectively. The second image processing means may carry out image processing steps which are desirable for the purposes of human vision applications, whereas the third image processing means may carry out image analysis specific for computer vision applications. This advantageously allows a single captured image to be used for both human and computer vision applications without the processes desirable for human vision applications affecting the computer vision image analysis.

For example, the second image processing means may carry out processes such as spatial noise reduction, sharpening and/or tone mapping which are desirable for the purposes of human vision applications. If computer vision image analysis is performed on an image processed according to one or more of these processes, the performance of the computer vision image analysis may be inhibited by artefacts of the one or more processes. However, since the first processed image data is provided to the third processing means (for performance of computer vision image analysis) separately to providing the first processed image data to the second image processing means (for the performance of human vision specific processes) the computer vision image analysis is unaffected by processes performed for the purposes of human vision applications.

The first image processing means may be arranged to not perform at least one of spatial noise reduction, sharpening and tone mapping to generate the first processed image data.

One or more of spatial noise reduction, sharpening and tone mapping may provide advantageous effects for the purposes of human vision applications. For example, one or more of these processes may improve human perception of aspects of the image when displayed to a human. However, one or more of these processes may produce artefacts in a processed image which may create undesirable effects if the processed image is used for the purposes of computer vision image analysis. For example, processing artefacts may reduce the effectiveness with which edges are detected in an image and/or may cause false edges to be detected in an image. Not performing one or more of spatial noise reduction, sharpening and tone mapping by the first image processing means, advantageously reduces the presence of any processing artefacts in the first processed image data (which is provided to the third image processing means). The effect of processing artefacts on computer vision image analysis performed by the third processing means is therefore reduced.

The third image processing means may be arranged to not perform at least one of spatial noise reduction, sharpening and tone mapping.

As was explained above, one or more of spatial noise reduction, sharpening and tone mapping may cause processing artefacts which may be undesirable for the purposes of computer vision image analysis. Not performing one or more of these processes by the third image processing means therefore advantageously reduces the presence of such processing artefacts in the image data which is used for the purposes of computer vision image analysis.

The second image processing means may be arranged to perform at least one of spatial noise reduction, sharpening and tone mapping to generate the second processed image data.

As was explained above one or more of spatial noise reduction, sharpening and tone mapping may improve human perception of aspects of the image when displayed to a human. Performing one or more of these processes by the second image processing means therefore improves the human perception of an image corresponding to the second processed image data (which is output by the second image processing means and provided to the display means).

The second image processing means may be arranged to perform spatial noise reduction on at least a portion of the first processed image data prior to rendering the first processed image data to generate the second processed image data.

Noise which is present in an image may spread through the image when the image is rendered by the rendering means. Performing a spatial noise reduction process on the first processed image data prior to performing the rendering, reduces the noise present in the image to be rendered and therefore reduces the spread of noise which occurs during the rendering process. Performing the noise reduction prior to the rendering therefore reduces a noise level present in the rendered image (when compared to performing the noise reduction after the rendering).

The second image processing means may be arranged to process the second processed image data after the rendering.

The rendered image may be provided to a display means for display to a human. Some image processing steps may improve perception of aspects of the rendered image to a human if they are performed after the rendering as opposed to being performed before the rendering. For example, performing an image processing step after the rendering may ensure that the image processing step is targeted at the rendered image itself (which is ultimately the image which is displayed) rather than an input to the rendering step.

The second image processing means is arranged to perform a sharpening process on the second processed image data.

Some rendering processes may include distorting all or part of an image, for example, to perform a perspective transform on all or part of the image. Consequently different regions of the rendered image which have the same size in the rendered image, may be formed based on regions of an input image (the first processed image data) which have different sizes. That is, different numbers of pixels in the input image may provide input to forming different regions of the rendered image. If a sharpening process is performed on the input image prior to rendering, the effects of the sharpening process may therefore appear unevenly in the rendered image. By applying a sharpening process to the image after rendering an even sharpening effect is achieved across the rendered image.

The second image processing means may be arranged to perform a tone mapping process on the second processed image data.

Some rendering process may include cropping the first processed image data such that only a portion of the first processed image data is included in the rendered image. A tone mapping process, typically adjusts intensity values of an image based on a range of intensity values present in the entire image. If a tone mapping process were to be performed on the first processed image data prior to the rendering process, the tone mapping process may therefore account for regions of the first processed image data which are not included in the rendered image. By performing a tone mapping process after the rendering process, the tone mapping process advantageously accounts only for those portions of the first processed image data which are included in the rendered image.

The second image processing means may be arranged to receive third processed image data generated from second image data received from a second imaging device. The rendering means may be arranged to combine at least a portion of the first processed image data and at least a portion of the third processed image data to form the second processed image data.

The third processed image data may be generated from the second image data by the first processing means. For example, the input means may receive the second image data from the second imaging device. The first image processing means may receive the second image data from the input means and may process the second image data to generate the third processed image data.

Alternatively, the third processed image data may be generated from the second image data by a separate processing means (different to the first processing means). For example, the input means may receive the third processed image data from a separate processing means (e.g. via the input means). The separate processing means may be associated with the second imaging device.

The first imaging device may be arranged to form the first image data based on radiation captured from a first perspective. The second imaging device may be arranged to form the second image data based on radiation captured from a second perspective, different to the first perspective.

The rendering process may combine different images captured from different perspectives so as to provide useful visual aid, for example, to a driver of a vehicle. For example, images captured from different perspectives around a vehicle may be combined to provide a plan view of a vehicle and its surroundings. Such a view may assist a driver of a vehicle when maneuvering the vehicle, such as when parking the vehicle.

Analysing the first processed image data may comprise determining information from the first processed image data.

Information determined from an image may be used, for example, to alert a driver of a vehicle according to the determined information. Additionally or alternatively information determined from an image may be used as an input to one or more automatic control systems. For example, determined information may provide an input to an autonomous driving system which may control one or more aspects of movement of the vehicle.

Determining information from the first processed image data may comprise detecting one or more objects present in the first processed image data.

For example, an image may be analysed so as to detect the presence of objects in the vicinity of the vehicle such as another vehicle, a pedestrian, a curb, a wall, markings on a road, a road sign etc. Detection of such objects may be used to alert a driver of the vehicle to the presence of such objects or to present information related to the objects. For example, the driver may be alerted to the presence of an object with which the vehicle may collide with and/or may be presented with relevant information determined from analysis of an image, such as a speed limit displayed by a road sign or a distance to an object. Additionally or alternatively detection of such objects may be input to an autonomous driving system which may control one or more aspects of movement of the vehicle. For example, the speed with which the vehicle travels may be controlled in dependence on one or more objects detected in a captured image, such as the presence and speed of other vehicles on the road, a speed limit determined from a road sign in the image and/or the presence of an obstruction such as a pedestrian in the road. Additionally or alternatively, the direction in which the vehicle travels may be controlled in dependence on one or more objects detected in a captured image, such as lane markings on a road, a curb and/or the presence of obstructions such as other vehicles, a wall, a post etc.

Detecting one or more objects present in the first processed image data may comprise performing an edge detection process to detect an edge of an object present in the first processed image data.

According to a still further aspect of the invention there is provided an image processor for a vehicle, as described above, wherein the input means comprises an input for receiving image data from an imaging device; the output means comprises an output for outputting processed image data to an electronic display; the display means comprises an electronic display; and the first processing means, second processing means and the third processing means comprises one or more electronic processors. In embodiments, the image processor comprises a rendering means which comprises a rendering module.

According to a still further aspect of the invention there is provided an imaging system for a vehicle, the system comprising: a first imaging arranged to capture image data; and an image processor as described above and arranged to receive the image data from the first imaging device.

According to a still further aspect of the invention there is provided an imaging system for a vehicle, the system comprising: a first imaging device positioned on or within the vehicle, the first imaging device being arranged to capture image data indicative of an image scene exterior to the vehicle; and an image processor as described above and arranged to receive the image data from the first imaging device.

The imaging system may comprise a display means arranged to receive second processed image data from the image processor and display an image corresponding to the second processed image data.

According to a still further aspect of the invention there is provided a vehicle comprising an image processor or an imaging system as described above.

According to a still further aspect of the invention there is provided an image processing method comprising: receiving image data from a first imaging device; processing the image data to generate first processed image data; generating an image for display by a display means, wherein the generating comprises rendering at least a portion of the first processed image data to generate second processed image data; outputting the second processed image data to the display means; and analysing the first processed image data.

According to a still further aspect of the invention there is provided an image processing method comprising: receiving image data from a first imaging device positioned on or within a vehicle, the image data being indicative of an image scene exterior to the vehicle; processing the image data to generate first processed image data; generating an image for display by a display means, wherein the generating comprises rendering at least a portion of the first processed image data to generate second processed image data; outputting the second processed image data to the display means; and analysing the first processed image data.

Processing the image data to generate the first processed image data may not comprise performing at least one of spatial noise reduction, sharpening and tone mapping.

Analysing the first processed image data may not comprise performing at least one of spatial noise reduction, sharpening and tone mapping.

Generating the second processed image data may comprise performing at least one of spatial noise reduction, sharpening and tone mapping.

Generating the second processed image data may comprise performing spatial noise reduction on at least a portion of the first processed image data prior to rendering the first processed image data.

Generating the second processed image data may comprise processing the second processed image data after the rendering.

Generating the second processed image data may comprise performing a sharpening process on the second processed image data.

Generating the second processed image data may comprise performing a tone mapping process on the second processed image data.

The method may comprise receiving third processed image data generated from second image data received from a second imaging device, wherein the rendering comprises combining the at least a portion of the first processed image data and at least a portion of the third processed image data to form the second processed image data.

The image data received from the first imaging device may be dependent on radiation captured from a first perspective. The second image data received from the second imaging device may be dependent on radiation captured from a second perspective, different to the first perspective.

Analysing the first processed image data may comprise determining information from the first processed image data.

Determining information from the first processed image data may comprise detecting one or more objects present in the first processed image data.

Detecting one or more objects present in the first processed image data may comprise performing an edge detection process to detect an edge of an object present in the first processed image data.

According to a still further aspect of the invention there is provided computer software which, when executed by a computer, is arranged to perform a method as described above. Optionally the computer software is stored on a computer readable medium.

The computer readable medium may comprise a non-transitory computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 8 is a schematic representation of a sharpening filter which may be applied to an image;

FIG. 9A is a portion of the image of FIG. 5; and

FIG. 9B is the portion of the image shown in FIG. 9A after a sharpening process is carried out on the image.

DETAILED DESCRIPTION

Figure 1:
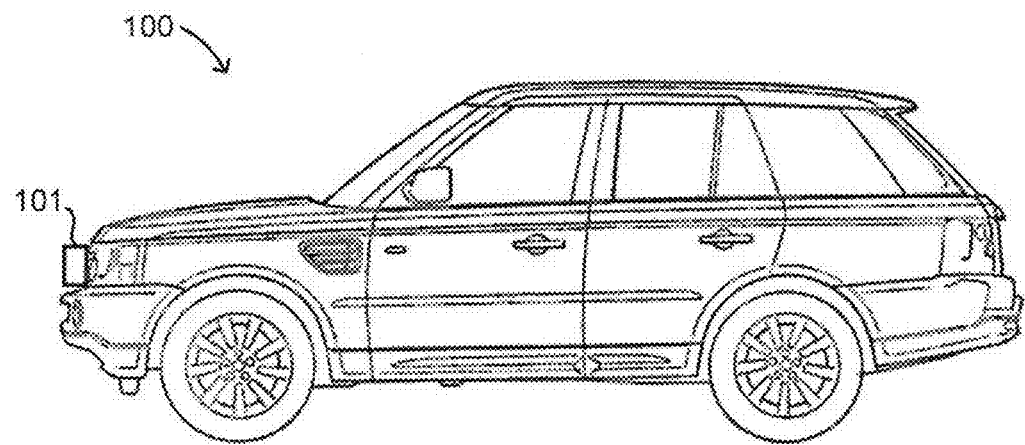
FIG. 1 is a schematic illustration of a vehicle according to an embodiment of the invention.

FIG. 1 is a schematic illustration of a vehicle 100 according to an embodiment of the invention. The vehicle 100 is illustrated in FIG. 1 as being a land-going vehicle, although it will be appreciated that embodiments of the invention are not limited in this respect and the vehicle may be a watercraft or aircraft. The vehicle 100 includes a first imaging device 101 arranged to capture image data. In particular, the first imaging device 101 is arranged to capture radiation and to form image data based on the captured radiation. The radiation may include, but is not limited to, one or more of electromagnetic radiation and acoustic radiation (for example ultrasonic radiation). The image data is therefore indicative of an image scene exterior to the vehicle 100.

In the representation shown in FIG. 1, the first imaging device 101 is schematically shown as being positioned proximate to the front of the vehicle 100. However, the first imaging device 101 may be positioned at other locations on the vehicle 100. For example, the first imaging device 101 may be located proximate to the rear of the vehicle 100, proximate to the side of the vehicle 100, proximate to the top of the vehicle 100 or proximate to the underside of the vehicle 100. In general, the first imaging device 101 may be located at any position on or in the vehicle and may be arranged to capture an image scene exterior to the vehicle 100.

In some embodiments, the vehicle 100 may comprise a plurality of imaging devices. Different imaging devices may be arranged to capture different image scenes exterior to the vehicle. For example, the vehicle 100 may comprise the first imaging device 101 and a second imaging device (not shown). The first imaging device 101 may be arranged to form first image data based on radiation captured from a first perspective and the second imaging device may be arranged to form second image data based on radiation captured from a second, different perspective. The first and second imaging devices may therefore capture different image scenes exterior to the vehicle. For example, the first imaging device may capture an image scene to the front of the vehicle and the second imaging device may capture an image scene to the rear of the vehicle. In some embodiments a first image scene captured by the first imaging device may overlap at least in part with a second image scene captured by the second imaging device.

In general, the vehicle 100 may comprise any number of imaging devices arranged to capture any number of different image scenes exterior to the vehicle 100. Whilst not shown in FIG. 1, the vehicle 100 further comprises an image processor. The image processor is arranged to receive image data from one or more imaging devices. The image processor and the one or more imaging devices may together be referred to as an imaging system. As will be described in more detail below, in some embodiments, an imaging system may further comprise a display means, for example, in the form of an electronic display.

Figure 2:
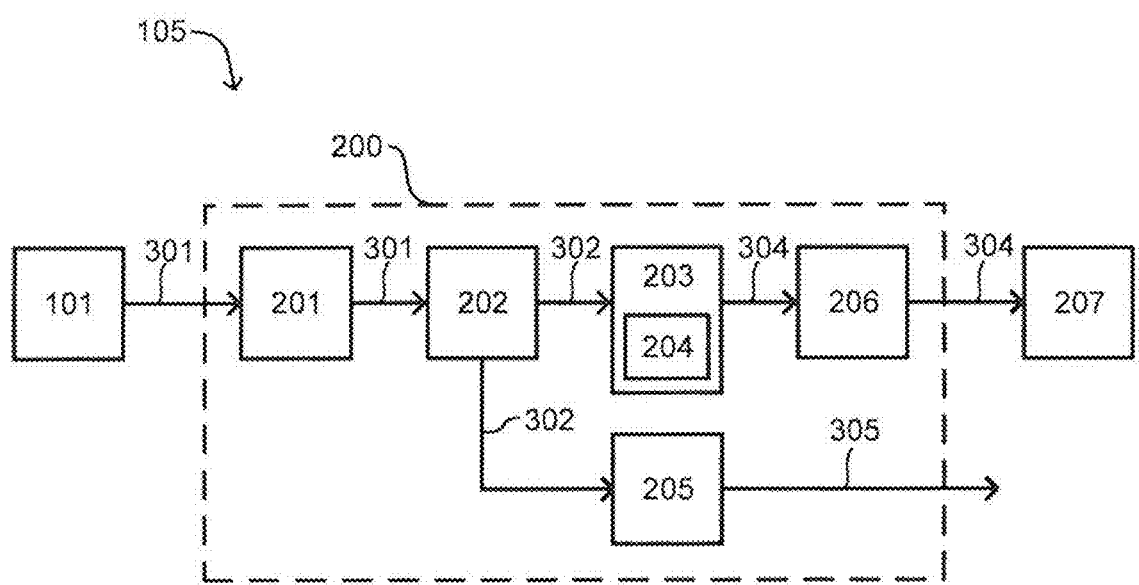
FIG. 2 is a schematic illustration of an image processing system according to an embodiment of the invention.

FIG. 2 is a schematic illustration of an imaging system 105 according to an embodiment of the invention. The imaging system 105 comprises the first imaging device 101, an image processor 200 and a display means 207. The image processor 200 comprises an input means 201, a first image processing means 202, a second image processing means 203, a third image processing means 205 and an output means 206. The second image processing means 203 includes a rendering means 204. The first image processing means 202, the second image processing means 203 and/or the third image processing means 205 may comprise one or more electronic processors. For example, in some embodiments the first 202, second 203 and third 205 image processing means may be realised in the form of a single electronic processor. In other embodiments, the first 202, second 204 and third 205 image processing means may be realised in the form of a plurality of electronic processors (e.g. each image processing means may be realised in the form of a separate processor).

As was explained above, the first imaging device 101 is arranged to capture image data 301. The input means 201 is arranged to receive the image data 301 from the first imaging device 101. The input means 201 may comprise an electrical input for receiving a signal from an imaging device. The first image processing means 202 is arranged to receive the image data 301 from the input means 201 and to process the image data 301 to generate first processed image data 302. The first processed image data 302 may be suitable for use for both human vision and computer vision applications. As will be described in more detail below, processing the image data 301 to generate the first processed image data 302 may not include performing at least one of spatial noise reduction, sharpening and tone mapping in order to generate the first processed image data 302.

The first processed image data 302 is provided to the second processing means 203 and the third processing means 205. The second processing means 203 is arranged to perform processes specific to human vision applications. The third processing means 205 is arranged to perform processes specific to computer vision applications. By providing the first processed image data 302 to separate processing means 203, 205 for human vision and computer vision applications, processing of a captured image is advantageously separated into different streams appropriate for different applications.

The third image processing means 205 receives the first processed image data 302 and analyses the first processed image data 302. For example, the third image processing means 205 may analyse the first processed image data 302 in order to determine information from the first processed image data 302. Determining information from the first processed image data 302 may, for example, comprise detecting one or more objects present in the first processed image data. For example, the first processed image data 302 may be analysed in order to detect the presence of one or more of other vehicles, pedestrians, road markings, road signs, curbs, obstructions etc. Detecting one or more objects present in the first processed image data may, for example, comprise performing an edge detection process to detect an edge of an object present in the first processed image data 302. An edge detection process may comprise detecting discontinuities in one or more properties (e.g. brightness or intensity) of an image and, in particular, detecting a boundary extending through the image and over which discontinuities occur. A boundary through an image and over which discontinuities occur may indicate an edge of an object in the image. In some embodiments other image analysis techniques may be used to determine information from the first processed image data 302.

Information which is determined from the first processed image data 302 is output from the third image processing means 205 in the form of information data 305. The information data 305 may, for example, be provided to one or more other systems arranged to receive the information data 305 as an input. For example, the information data may be provided to an autonomous driving system operable to control one or more aspects of movement of the vehicle. Additionally or alternatively, the information data 305 may be provided to a display means (e.g. the display means 207) operable to display indications of information determined from the first image data 305.

Whilst in the illustration shown in FIG. 2, the information data 305 is shown as being output separately from the output means 206, in some embodiments the information data 305 may be provided to the output means 206 and output by the output means 206. For example, the output means 206 may output the information data 305 to the display means 207. In some embodiments, the image processor 200 may include a separate output means (separate from the output means 206) for outputting the information data 305 to one or more other components.

The first processed image data 302 is also provided to the second image processing means 203. The second image processing means 203 is arranged to receive the first processed image data 302 and to generate an image for display by the display means 207. The second image processing means 203 is therefore arranged to perform functions specific to human vision applications. The second image processing means 203 includes rendering means 204. The rendering means 204 is arranged to render at least a portion of the first processed image data 302 to generate second processed image data 304. The second image processing means 203 and the rendering means 204 will be described in further detail below.

The second image processing means 203 outputs the second processed image data 304 to the output means 206. The output means 206 outputs the second processed image data 304 to the display means 207. The display means 207 may be an electronic display arranged to display an image corresponding to the second processed image data 304. For example, the display may be positioned such that it is visible to a driver of the vehicle 100 and may display an image which assists the driver when driving the vehicle 100.

Figure 3:
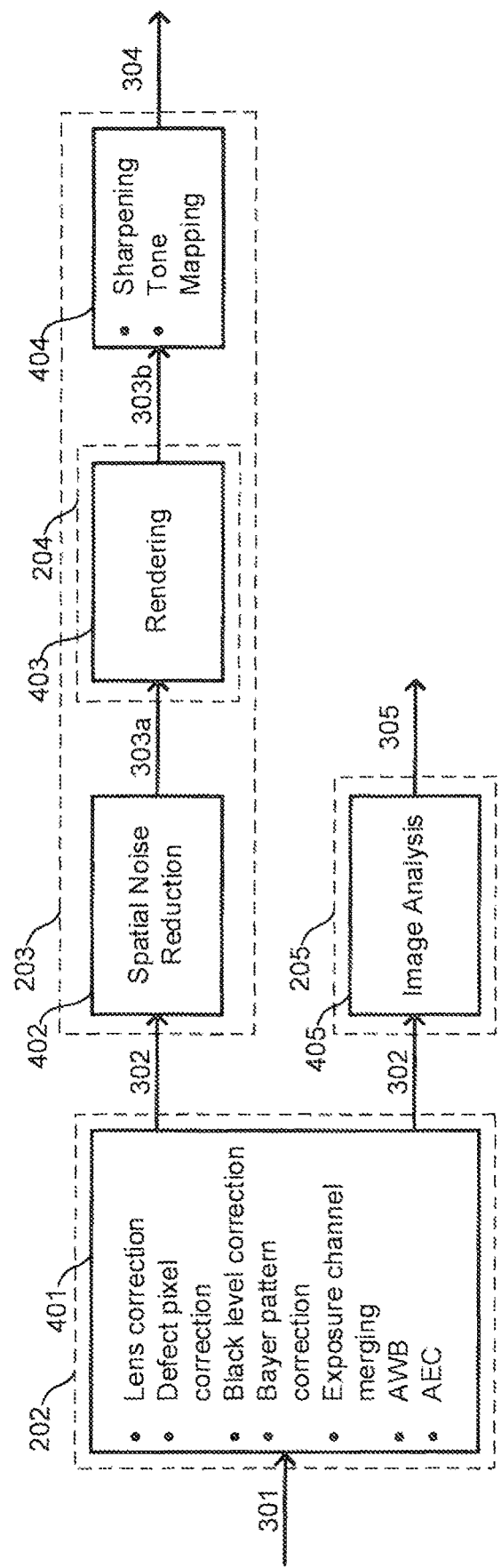
FIG. 3 is schematic representation of processing stages carried out according to an embodiment of the invention.

FIG. 3 is a schematic representation of processing stages carried out according to an embodiment of the invention. Each solid outlined box in FIG. 3 represents a processing stage at which one or more processes are carried out. The dashed outlined boxes in FIG. 3 indicate the image processing means (as introduced with reference to FIG. 2) which carries out the one or more processes.

At a first processing stage 401 carried out by the first image processing means 202, image data 301 is processed to form first processed image data 302. The image data 301 may be described as raw image data and may, for example, comprise intensity values recorded by a plurality of different sensing elements which form the first imaging device 301. For example, the first imaging device 101 may comprise an array of sensing elements each arranged to receive radiation and output a signal indicative of the intensity of radiation received at the sensing element. The first imaging device 101 may, for example, comprise a complementary metal-oxide semiconductor (CMOS) sensor and/or a charge-coupled device (CCD) sensor. The image data 301 may include values indicative of the intensity of radiation received at each sensing element. The image data 301 may also include metadata indicative of properties of the first image sensor 101.

The first image processing means 202 may be arranged to use the intensity values and the metadata contained in the image data 301 to form the first processed image data 302. The first processed image data 302 may comprise intensity values associated with a plurality of pixels which form an image. The image may be a colour image such that a plurality of intensity values are associated with each pixel, where different intensity values associated with a single pixel are related to the intensity of different colours in the pixel. For example, a red intensity value, a green intensity value and a blue intensity value may be associated with each pixel.

As indicated in FIG. 3, processing, by the first image processing means 202, to form the first processed image data 302 may comprise one or more of lens correction, defect pixel correction, black level correction, Bayer pattern correction, exposure channel merging, automatic white balance (AWB) and automatic exposure control (AEC).

A lens correction process may comprise correcting image data for optical irregularities (such as chromatic aberration) present in a lens of an imaging device.

A defect pixel correction process may comprise correcting for the effect of defective sensing elements in an imaging device. For example, one or more sensing elements in an imaging device may be defective and may, for example, output no signal even when radiation is received at the sensing element. If uncorrected for, this can appear as abnormally dark pixels in a processed image. A defect pixel correction process may assign a dark pixel with an intensity value corresponding to an average of intensity values associated with pixels surrounding a dark pixel so that the pixel no longer appears as a dark pixel but matches the surrounding pixels.

A black level correction process may comprise adjusting a black level of an image formed by the first image processing means 202. This may, for example, comprise subtracting a reference signal from intensity values associated with sensor elements so as to correct for thermally generated voltages in the sensor elements.

A Bayer pattern correction process may comprise extracting colour information from intensity values output from different sensor elements. For example, intensity values output from different sensor elements may be used to assign a red intensity value, a green intensity value and a blue intensity value to a plurality of different pixels.

Merging different exposure channels may comprise forming an image from data collected during a number of different exposures of sensor elements which form an imaging device. For example, an imaging device may expose the sensor elements during a plurality of different exposures where each exposure lasts for a different period of time. An image may be formed by merging data collected during different exposures. For example, darker areas of an image may be populated using data collected during a relatively long exposure time whereas brighter areas of an image may be populated using data collected during relatively short exposure times.

An automatic white balance (AWB) process may comprise correcting an image for different lighting conditions. For example, image data captured under yellow light (such as a street light), direct sunlight, indirect sunlight, shady conditions etc. may be corrected according to the lighting conditions under which the image data is captured.

An automatic exposure control (AEC) process may comprise correcting intensity values which form an image based on the exposure time used to capture the image.

In some embodiments, the first processing means 202 may be arranged to carry out all of the processes described above, one of the processes described above or a subset of the processes described above. In some embodiments, the first processing means 202 may be arranged to perform other processes not specifically described herein. In general the first processing means 202 is arranged to form first processed image data 302, which is suitable for both human vision and computer vision applications. In particular, the first processing means 202 does not perform processes which are specifically desirable for human vision applications but which are not necessarily desirable for computer vision applications. For example, the first processing means 202 may not perform processes such as spatial noise reduction, sharpening and tone mapping. As will be described in further detail below, such processes may be undesirable for computer vision applications.

The first processed image data 302 is provided to the second image processing means 203 and the third image processing means 205. In a second processing stage 402, the second image processing means 203 performs a spatial noise reduction process. Image data 301 which is output from an imaging device (e.g. the first imaging device 101) typically includes a degree of noise generated in the imaging device. Consequently an image corresponding to the first processed image data 302 also includes noise. Noise may manifest itself as a random variation in brightness and/or colour in an image. When displaying an image to be viewed by a human, image noise is perceived by humans as an unpleasant degradation in image quality. It may be therefore desirable to perform a noise reduction process on an image which is to be used for human vision applications.

Figures 4, 5:
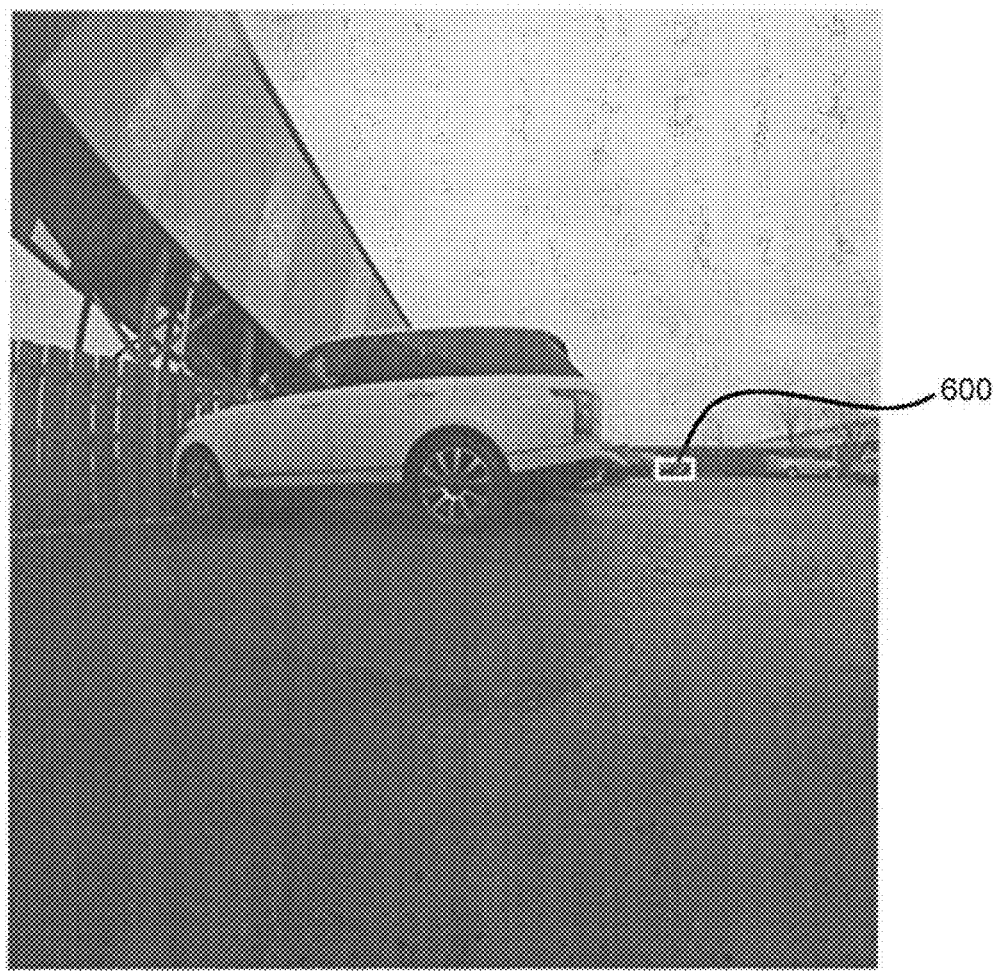
FIG. 4 is a schematic representation of a spatial noise filter which may be applied to an image.
FIG. 5 is an example image captured by an imaging device.

The spatial noise reduction process carried out in the second processing stage 402 may comprise applying a spatial noise reduction filter to each pixel of the first processed image data 302. Applying a spatial noise reduction filter may comprise setting the intensity value of a pixel using intensity values of surrounding pixels, as well as the intensity value of the pixel itself. A typical spatial noise reduction filter is depicted in FIG. 4. The boxes in FIG. 4 represent pixels which form a portion of an image. The numbers included in the boxes indicate the contribution of the intensity values associated with different pixels to setting a noise filtered intensity value for a central pixel 501. That is, after applying a spatial noise filter the intensity value of the central pixel 501 is set as a weighted combination of intensity values associated with the central pixel 501 itself and intensity values associated with pixels surrounding the central pixel 501. In the example, depicted in FIG. 4, the noise filtered intensity value of the central pixel 501 is set as a combination of one half of the intensity value associated with the central pixel 501 and one eighth of the intensity values associated with each of the pixels immediately above, below, to the left and to the right of the central pixel 501. Such a process may be carried out on each of the pixels which form an image so as to create a noise filtered image. In embodiments in which the image is a colour image, such a noise filtering process may be carried out for intensity values representing each of a plurality of different colours. For example, a spatial noise filter may be applied to each of red, green and blue intensity values which form a colour image.

FIG. 5 shows an example image captured by an imaging device of a vehicle 100. The image which is shown in FIG. 5 represents first processed image data 302. That is, raw image data 301 captured by an imaging device has undergone processing in order to form first processed image data 302 which is represented in FIG. 5. In order to depict the effects of applying a spatial noise filter, a portion 600 of the image shown is FIG. 5 is highlighted and shown in more detail in FIGS. 6A and 6B.

Figure 6A:
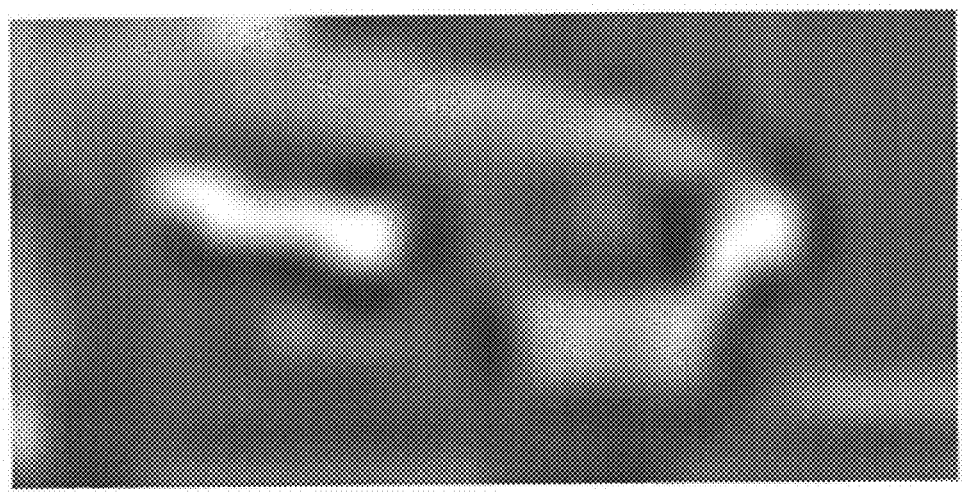
FIG. 6A is a portion of the image of FIG. 5.
Figure 6B:
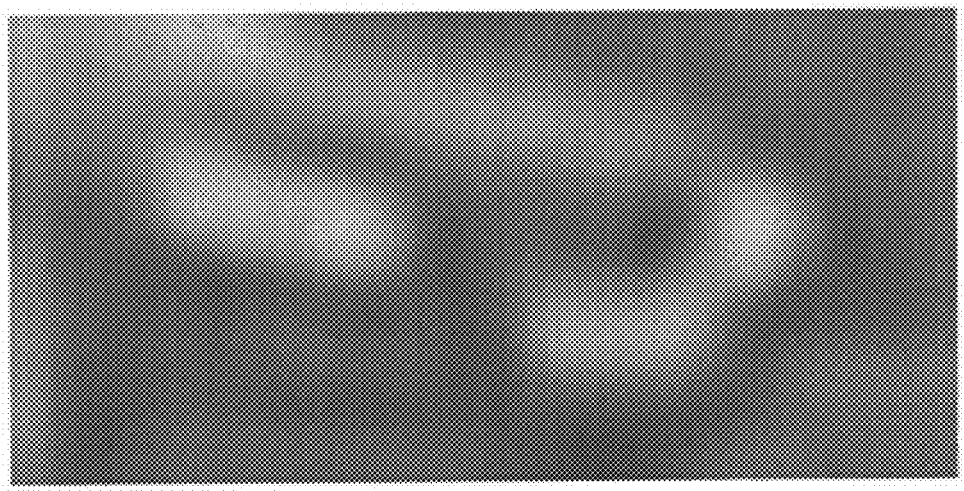
FIG. 6B is the portion of the image shown in FIG. 6A after a spatial noise reduction process is carried out on the image.

FIG. 6A shows the portion 600 of the image shown in FIG. 5 before a spatial noise filter is applied and FIG. 6B shows the same portion after the spatial noise filter has been applied. In the particular example, represented in FIGS. 5, 6A and 6B, the portion 600 of the image includes an object (the front of another vehicle), which is situated approximately 20 metres from the imaging device used to capture the image. The image was captured using a 1 megapixel imaging device over a horizontal field of view of approximately 190 degrees. In such an example, each horizontal pixel represents radiation received in a horizontal angular range of approximately 0.15 degrees. When capturing an object situated approximately 20 metres from the imaging device (as shown in FIGS. 6A and 6B), an object having a horizontal extent of about 10 cm appears on approximately two pixels of the image. That is, each pixel represents radiation captured from a region of the object having a horizontal extent of approximately 5 cm.

The image which is shown in FIG. 6A represents the portion 600 of the image of FIG. 5 before a spatial noise reduction filter is applied to the image. The image which is shown in FIG. 6B represents the portion 600 of the image of FIG. 5 after a spatial noise reduction filter is applied to the image. By comparing FIGS. 6A and 6B it can be seen that spatial noise reduction serves to reduce the effects of noise in the image and to improve perception of aspects of the image when displayed to a human. However, the spatial noise reduction filter also serves to blur the image such that edges of objects which appear in the image are less prominent. For example, the image shown in FIGS. 6A and 6B include front headlights and a front registration plate of another vehicle. These objects appear clearly in FIG. 6A as lighter shaded regions having sharp edges. However, in FIG. 6B (after a noise reduction filter has been applied) these objects have been blurred and edges of the objects are less prominent.

As was explained above edges of objects appear more prominently in FIG. 6A than in FIG. 6B. It will therefore be appreciated that an edge detection process performed on the image shown in FIG. 6B may be less likely to accurately detect edges of the objects than an edge detection process performed on the image shown in FIG. 6A. Whilst the image shown in FIG. 6B improves human perception of aspects of the image when compared to the image shown in FIG. 6A, and is therefore more suitable for human vision applications, using the image which is shown in FIG. 6B for computer vision applications may inhibit the performance of computer vision analysis techniques (such as edge detection), when compared to using the image shown in FIG. 6A. That is, it may be desirable to use an image which has not had a spatial noise reduction process carried out on it (e.g. the image shown in FIG. 6A) for computer vision applications and to use an image which has had a spatial noise reduction process carried out on it (e.g. the image shown in FIG. 6B) for human vision applications.

Referring again to FIG. 3, processed image data 303a which has undergone a spatial noise reduction process (at the second processing stage 402) undergoes a rendering process at a third processing stage 403. The rendering process is performed by the rendering means 204 which forms part of the second image processing means 203. In general, rendering refers to one or more processes which have the effect of changing the perspective and/or field of view of an image. For example, rendering may include cropping an image, transforming the perspective of the image and/or combining all or part of an image with all or part of another image.

Figure 7A:
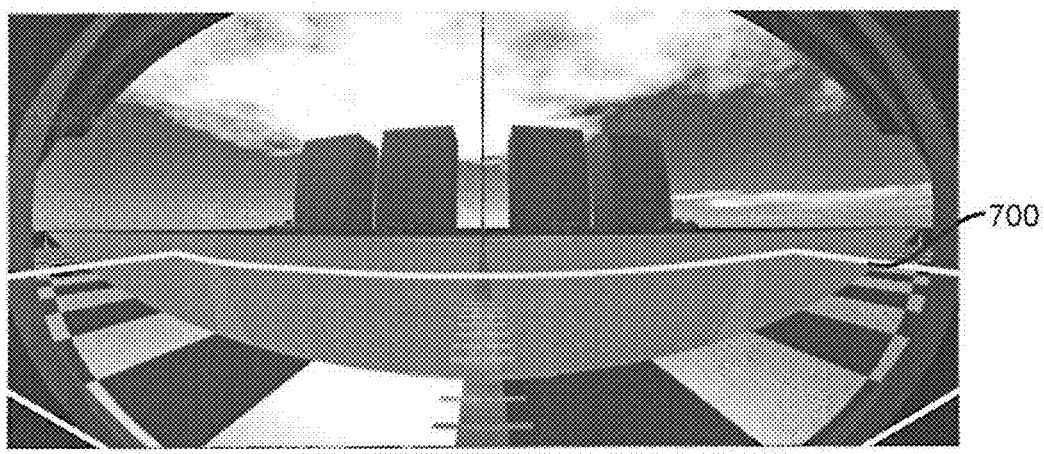
FIG. 7A is an example image captured by an imaging device.
Figure 7B:
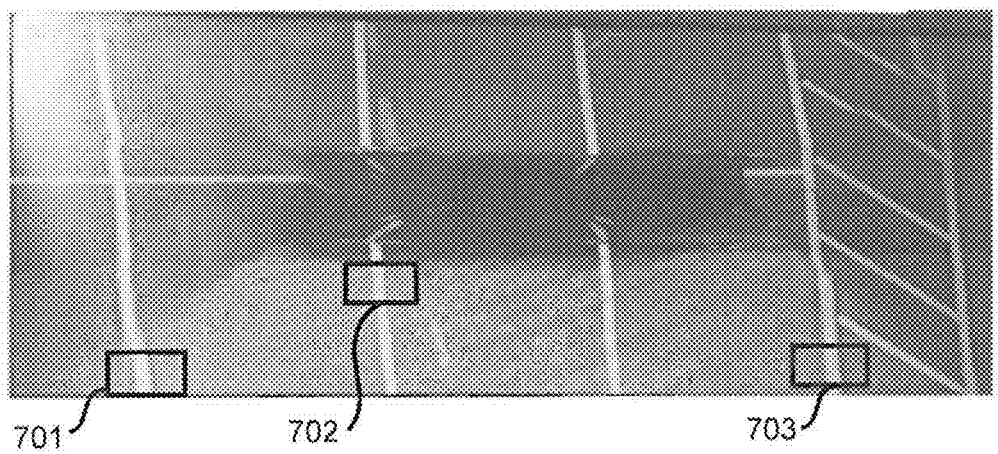
FIG. 7B is a rendered image formed at least in part from a portion of the image of FIG. 7A.

FIG. 7A shows an example of an image captured by an imaging device situated on a vehicle. FIG. 7B shows an example of an image which may be formed by rendering a portion of an image such as the image shown in FIG. 7A. FIG. 7B represents a plan view of a vehicle and its surroundings. A portion 700 of the image of FIG. 7A which may be used to form an image of the type shown in FIG. 7B is outlined with a white line 700 in FIG. 7A. The image which is shown in FIG. 7B may be formed by transforming the perspective of the portion 700 of the image of FIG. 7A and combining the transformed portion 700 with other transformed images captured from other imaging devices. These processes are considered to be examples of rendering processes.

The vehicle which is represented in FIG. 7B may include a plurality of imaging devices arranged to capture radiation from different perspectives. For example, the vehicle may include an imaging device arranged to capture radiation from a perspective of viewing out to the front of the vehicle, an imaging device arranged to capture radiation from a perspective of viewing out of the rear of the vehicle and one or more imaging devices arranged to capture radiation from a perspective of viewing out of the side of the vehicle. At least a portion of images captured using different imaging devices may be processed to transform the perspective of the images. For example, perspective transforms of portions of the images may be performed so as to form images which appear to be viewed from a perspective of looking down on the vehicle as viewed from above the vehicle. The transformed portions may then be combined to form an image representing a plan view of the vehicle and its surrounds as shown in FIG. 7B. Such a process may be referred to as a rendering process.

An image of the form which is shown in FIG. 7B may, in some situations, be displayed to a driver of the vehicle (e.g. using the display means 207). Such an image may assist the driver when maneuvering the vehicle around one or more objects, for example, when parking the vehicle.

Perspective transforms of the type described above with reference to FIGS. 7A and 7B may be performed, for example, by mapping pixels of the image of FIG. 7A onto pixels of the image shown in FIG. 7B according to a predetermined transformation model. The predetermined transformation model may account for the position and orientation of one or more imaging devices and the optical characteristics of the one or more imaging devices.

Whilst a specific example of a rendering process has been described above with reference to FIGS. 7A and 7B, it will be appreciated that a rendering process as referred to herein may take on a variety of different forms. For example, a rendering process may simply include cropping an image so as to reduce the field of view of the image. Whilst, the rendering process described above includes combining portions of different images captured using different imaging devices, a rendering process need not necessarily include combining all or part of different images. For example, a rendering process may comprise transforming the perspective and/or the field of view of a single image captured by a single imaging device.

In embodiments in which a rendering process includes combining all or part of different images captured by different imaging devices, the second image processing means 203 may be arranged to receive third processed image data in addition to the first processed image data 301. The third processed image data may be generated from second image data received from a second imaging device. The rendering means 204 may be arranged to combine at least a portion of the third processed image data and the first processed image data 302 to form the second processed image data 304.

In such an embodiment, the third processed image data may be generated from the second image data by the first processing means 202. For example, the input means 201 may receive the second image data from the second imaging device. The first image processing means 202 may receive the second image data from the input means 201 and may process the second image data to generate the third processed image data.

Alternatively, the third processed image data may be generated from the second image data by a separate processing means (different to the first processing means 202 and not shown in the Figures). For example, the input means may receive the third processed image data from a separate processing means (e.g. via the input means 201). The separate processing means (not shown) may be associated with the second imaging device.

In general, any number of sets of processed image data, captured from any number of different imaging devices, may be received by the second image processing means 203 and may be combined by the rendering means 204.

Referring again to FIG. 3, processed image data 303b which has undergone a rendering process (at the third processing stage 403) undergoes a sharpening process and a tone mapping process at a fourth processing stage 404.

A sharpening process is designed to sharpen the appearance of objects in the image and improve the contrast between neighbouring portions of the image having different brightness intensities. For example, a sharpening process may serve to create an image where the contrast between light and dark areas of the image is increased. A sharpening process may serve to make the image appear to be of a better quality when viewed by a human. A sharpening process may comprise applying a sharpening filter to an image.

A typical sharpening filter which may be applied is shown in FIG. 8. The principle of the filter which is shown in FIG. 8 is the same as the noise reduction filter which was described above with reference to FIG. 4. That is, the boxes in FIG. 8 represent pixels which form a portion of an image. The numbers included in the boxes indicate the contribution of the intensity values associated with different pixels to setting a sharpened intensity value for a central pixel 801. That is, after applying a sharpening filter the intensity value of the central pixel 801 is set as a weighted combination of intensity values associated with the central pixel 801 itself and intensity values associated with pixels surrounding the central pixel 801. In the example, depicted in FIG. 8, the sharpened intensity value of the central pixel 801 is set as a combination of two times the intensity value associated with the central pixel 801 and minus a quarter of the intensity values associated with each of the pixels immediately above, below, to the left and to the right of the central pixel 801. Such a process may be carried out on each of the pixels which form an image so as to create a sharpened image. In embodiments in which the image is a colour image, such a sharpening process may be carried out for intensity values representing each of a plurality of different colours. For example, a sharpening filter may be applied to each of red, green and blue intensity values which form a colour image.

An example of the application of a sharpening filter on an image is shown in FIGS. 9A and 9B. FIG. 9A shows the portion 600 of the image shown in FIG. 5 before a sharpening filter is applied and FIG. 9B shows the same portion after the sharpening filter is applied. By comparing FIGS. 9A and 9B it can be seen that the sharpening filter serves to sharpen features of the image so as to make them appear more prominently in the image when viewed by a human.

A sharpening filter may cause effects to occur which are known as overshoot and undershoot. Overshoot may refer to increasing the brightness of bright regions and undershoot may refer to reducing the brightness of dark regions. The image shown in FIGS. 9A and 9B includes a headlight 901 of a vehicle which appears as a high intensity bright portion of the image. The headlight 901 is surrounded by a region 902 which appears to be darker and have a lower intensity than other surrounding regions. By comparing FIGS. 9A and 9B it can be seen that the sharpening filter serves to increase the brightness of the headlight 901 (which may be referred to as overshoot) and decrease the brightness of the surrounding darker region 902 (which may be referred to as undershoot). These effects serve to accentuate the appearance of the headlight 901 in the image and make the headlight 901 appear to be clearer and more prominent in the image when viewed by a human.

However, the sharpening process also serves to accentuate the darker region 902 which surrounds the headlight 901. If an edge detection process were to be carried out on the sharpened image of FIG. 9B, the edge detection process may determine that the darker region 902 is an edge of an object in the image. However, the accentuated darker region 902 is merely an artefact of the sharpening filter which has been applied to the image. If a sharpened image were to be used for computer vision applications, such as performing an edge detection process, artefacts of a sharpening process may therefore lead to false edge detection in the image. In particular, a sharpening process tends to form false edges adjacent to actual edges. For example, the darker region 902 represents a false edge adjacent to the actual edge of the headlight 901. This effect is further illustrated in FIG. 9B by a darker region 903 which is adjacent to an edge of a bonnet of the vehicle shown in the image. The sharpening process has served to accentuate the darker region 903 in the image such that it may be detected as a false edge if an edge detection process is carried out on the sharpened image of FIG. 9B.

As was explained above, a sharpening process may improve an image for the purposes of human vision applications. However, using a sharpened image (such as the image shown in FIG. 9B) for computer vision applications may inhibit the performance of computer vision analysis techniques (such as edge detection), when compared to using an unsharpened image (such as the image shown in FIG. 9A). That is, it may be desirable to use an image which has not had a sharpening process carried out on it (e.g. the image shown in FIG. 9A) for computer vision applications and to use an image which has had a sharpening process carried out on it (e.g. the image shown in FIG. 9B) for human vision applications.

Also carried out as part of the fourth processing stage 404 is a tone mapping process. A tone mapping process serves to map intensity values of an image to another set of intensity values. A tone mapping process may, for example, be used to increase a dynamic range of an image. For example, the tone mapping process may serve to make dark regions of an image appear darker and may serve to make bright regions of an image to appear brighter. This may increase a contrast between different regions of an image and may serve to improve the clarity of the image when viewed by a human. However, such a tone mapping process may serve to supress details of the image in some regions of the image. For example, details of the image in a relatively dark or bright region of the image may be suppressed by the tone mapping process. If such an image were to be used for computer vision applications, such as performing an edge detection process on the image, the suppression of image details caused by the tone mapping process may cause edges of objects in the image to be missed by the edge detection process. Consequently, it may be preferable to use an image which has not had a tone mapping process performed on it for computer vision applications, whereas it may be preferable to use an image which has had a tone mapping process carried out on it for human vision applications.

As was described in detail above, it may be desirable to perform one or more image processing steps on an image to be used for human vision applications (e.g. spatial noise reduction, rendering, sharpening and/or tone mapping), which can lead to undesirable effects if the same image were to be used for computer vision applications. As is shown, for example in FIG. 3, according to embodiments of the invention, processing of image data is split into two different processing streams. That is, the first processed image data 302 is provided to the second image processing means 203 which is arranged to perform processes which may be desirable for the purposes of human vision applications and to the third image processing means 205 which is arranged to perform processes specific to computer vision applications. As is shown in FIG. 3, the third image processing means 205 performs image analysis on the first processed image data 302 in a fifth processing stage 405 and outputs information data 305 formed by the image analysis. Due to the split processing stream approach which is adopted, processes such as spatial noise reduction, sharpening and tone mapping which may be applied to the second processed image data 304 used for human vision applications have not been performed on the first processed image data 302 which is analysed for the purposes of computer vision applications at the fifth processing stage 405. Consequently the performance of computer vision image analysis performed at the fourth processing stage 405 is not degraded by human vision specific processes carried out in the second 402, third 403 and fourth 404 processing stages.

In the embodiment represented in FIG. 3, the spatial noise reduction process is carried out prior to the rendering process, and the sharpening and tone mapping processes are carried out after the rendering process.

It may be desirable to perform the spatial noise reduction process (in the second processing stage 402) prior to the rendering process (in the third processing stage 403) to reduce a spread of image noise during the rendering process. As will be appreciated, for example from the description of a rendering process provided above with reference to FIGS. 7A and 7B, that a rendering process may involve distorting one or more regions of an image. For example, as was described above a perspective transform of the portion 700 of the image of FIG. 7A is performed in order to form part of the image shown in FIG. 7B. As part of the perspective transform process, the portion 700 of the image of FIG. 7A is distorted such that the aspect ratio and shape of objects (e.g. the black and white squares) shown in the portion 700 changes between the image in FIG. 7A and FIG. 7B. Such a distortion of the portion 700 of the image of FIG. 7A could cause noise in the image of FIG. 7A to be spread during the rendering process. Performing the spatial noise reduction process prior to the rendering process advantageously reduces noise in the image prior to the noise being spread during the rendering process. Consequently an amount of noise in the rendered image is advantageously reduced.

It may be desirable to perform the sharpening process (in the fourth processing stage 404) after the rendering process (in the third processing stage 403) in order to provide an even sharpening effect in the rendered image. As will be appreciated, for example from a comparison of FIGS. 7A and 7B, different regions of the rendered image of FIG. 7B are formed according to information from different numbers of pixels in the image of FIG. 7A. For example, a first region 701, a second region 702 and a third region 703 are shown in FIG. 7B, where each of the first 701, second 702 and third 703 regions of FIG. 7B are formed according to different sections of the portion 700 of FIG. 7A. Each of the first 701, second 702 and third 703 regions of FIG. 7B have the same area and dimensions in FIG. 7B. However, the different regions 701, 702, 703 are formed based on differently sized sections of the portion 700 of FIG. 7A, which include different numbers of pixels. For example the section of the portion 700 of FIG. 7A on which the second region 702 of FIG. 7B is based, is larger and contains more pixels than the sections of the portion 700 of FIG. 7A, on which the first 701 and third 703 regions of FIG. 7B are based.

If a sharpening process were to be performed on the image of FIG. 7A prior to rendering the portion 700 to form the rendered image of FIG. 7B, the effects of the sharpening would therefore be uneven in the rendered image of FIG. 7B, since different regions 701, 702, 703 are based on different numbers of pixels. For example, a level of undershoot and overshoot appearing in the second region 702 may be different to a level of undershoot and overshoot appearing in the first 701 and third 703 regions. By performing the sharpening process on the rendered image of FIG. 7B, the effect of the sharpening (i.e. the level of undershoot and overshoot) is relatively even throughout the rendered image.

It may be desirable to perform the tone mapping process (in the fourth processing stage 404) after the rendering process (in the third processing stage 403) in order to prevent portions of an image which are not included in a rendered image from influencing the rendered image. A tone mapping process may comprise mapping intensity values of an image to another set of intensity values based on the range of different intensity values present in the image. For example, a tone mapping process carried out on the image in FIG. 7A may take into account the intensity of pixels both inside the portion 700 and outside of the portion 700. Intensity values of pixels of the image of FIG. 7A, which lie outside of the portion 700 may therefore influence tone mapping which is carried out on pixels inside the portion 700. However, only the pixels which lie inside the portion 700 appear in the rendered image of FIG. 7B. Therefore if a tone mapping process were to be carried out on the image of FIG. 7A before the rendering, pixels outside of the portion 700 of FIG. 7A (which are not included in the rendered image of FIG. 7B) would influence the intensity of pixels in the rendered image of FIG. 7B. By performing the tone mapping process on the rendered image (i.e. after the rendering has been carried out), the tone mapping is advantageously based only on pixels which are included in the rendered image.

Whilst in the embodiment described above with reference to FIGS. 3-9, each of a spatial noise reduction, a sharpening and a tone mapping process are carried out, in some embodiments none of a spatial noise reduction, a sharpening and a tone mapping process may be carried out and one or more different image processing steps may instead be carried out. In some embodiments only one or two of a noise reduction and a tone mapping process may be carried out. In some embodiments, additional image processing steps different to spatial noise reduction, sharpening and tone mapping may be carried out. Such additional image processing steps may be carried out in addition to or instead of one or more of spatial noise reduction, sharpening and tone mapping.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An image processor for a vehicle, the image processor comprising:
    an input arranged to receive image data from a first imaging device positioned on or within the vehicle, the image data being indicative of an image scene exterior to the vehicle;
    a first electronic processor for receiving the image data from the input and processing the image data to generate first processed image data;
    a second electronic processor arranged to receive the first processed image data to generate an image for display by an electronic display, wherein the second electronic processor comprises a rendering module for rendering at least a portion of the first processed image data to generate second processed image data;
    an output for outputting the second processed image data to the electronic display; and
    a third electronic processor arranged to receive the first processed image data and to analyse the first processed image data.

2. The image processor of claim 1, wherein the first electronic processor is arranged to not perform at least one of spatial noise reduction, sharpening and tone mapping to generate the first processed image data.

3. The image processor of claim 1, wherein the third electronic processor is arranged to not perform at least one of spatial noise reduction, sharpening and tone mapping.

4. The image processor of claim 1, wherein the second electronic processor is arranged to perform at least one of spatial noise reduction, sharpening and tone mapping to generate the second processed image data.

5. The image processor of claim 4, wherein the second electronic processor is arranged to perform spatial noise reduction on at least a portion of the first processed image data prior to rendering the first processed image data to generate the second processed image data.

6. The image processor of claim 1, wherein the second electronic processor is arranged to process the second processed image data after the rendering.

7. The image processor of claim 6, wherein the second electronic processor is arranged to perform a sharpening process on the second processed image data.

8. The image processor of claim 6, wherein the second electronic processor is arranged to perform a tone mapping process on the second processed image data.

9. The image processor of claim 1, wherein the second electronic processor is arranged to receive third processed image data generated from second image data received from a second imaging device and wherein the rendering module is arranged to combine at least a portion of the first processed image data and at least a portion of the third processed image data to form the second processed image data.

10. The image processor of claim 9, wherein the first imaging device is arranged to form the first image data based on radiation captured from a first perspective and the second imaging device is arranged to form the second image data based on radiation captured from a second perspective, different to the first perspective.

11. The image processor of claim 1, wherein analysing the first processed image data comprises determining information from the first processed image data.

12. The image processor of claim 11, wherein determining information from the first processed image data comprises detecting one or more objects present in the first processed image data.

13. The image processor of claim 12, wherein detecting one or more objects present in the first processed image data comprises performing an edge detection process to detect an edge of an object present in the first processed image data.

14. An imaging system for a vehicle, the system comprising:

a first imaging device positioned on or within the vehicle, the first imaging device being arranged to capture image data indicative of an image scene exterior to the vehicle; and the image processor of claim 1 arranged to receive the image data from the first imaging device.

15. The imaging system of claim 14, wherein the system comprises an electronic display arranged to receive second processed image data from the image processor and display an image corresponding to the second processed image data.

16. A vehicle comprising the image processor according to claim 1.

17. An image processing method comprising:

receiving image data from a first imaging device positioned on or within a vehicle, the image data being indicative of an image scene exterior to the vehicle;

processing the image data to generate first processed image data;

generating an image for display by an electronic display, wherein the generating comprises rendering at least a portion of the first processed image data to generate second processed image data;

outputting the second processed image data to the electronic display; and analysing the first processed image data.

18. The method of claim 17, wherein processing the image data to generate the first processed image data does not comprise performing at least one of spatial noise reduction, sharpening and tone mapping.

19. The method of claim 17, wherein generating the second processed image data comprises performing at least one of spatial noise reduction, sharpening and tone mapping.

20. A computer program product comprising a non-transitory computer readable storage medium having encoded thereon instructions that, when executed on a computer, cause the computer to perform the method of claim 17.

* * * * *